US012570335B2

(12) United States Patent (10) Patent No.: US 12,570,335 B2

Sanchez Rodriguez et al. (45) Date of Patent: Mar. 10, 2026

(54) CHAIN OF SEMI-TRAILER VEHICLES AND ASSOCIATED ARTICULATED TRAINSET

(71) Applicant: ALSTOM HOLDINGS, St Ouen sur Seine (FR)

(72) Inventors: Carlos Sanchez Rodriguez, Paris (FR); Cyril Costes, Buxy (FR); Fabrice Cottin, Buxy (FR); Juan Manuel Teodoro, Paris (FR)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 803 days.

(21) Appl. No.: 17/810,550

(22) Filed: Jul. 1, 2022

(65) Prior Publication Data

US 2023/0001962 A1 Jan. 5, 2023

(30) Foreign Application Priority Data

Jul. 5, 2021 (FR) ...................................... 21 07248

(51) Int. Cl.
| | |
|---|---|
| *B61G 5/02* | (2006.01) |
| *B60F 1/04* | (2006.01) |
| *B61D 3/10* | (2006.01) |
| *B61F 3/12* | (2006.01) |

(52) U.S. Cl.
CPC ............... *B61G 5/02* (2013.01); *B60F 1/046* (2013.01); *B61D 3/10* (2013.01); *B61F 3/12* (2013.01); *B61F 3/125* (2013.01)

(58) Field of Classification Search
CPC ... B61G 5/02; B61F 3/12; B61F 3/125; B61D 3/10; B60F 1/046
See application file for complete search history.

(56) References Cited

U.S. PATENT DOCUMENTS

| | | | |
|---|---|---|---|
| 4,773,335 A * | 9/1988 | Smith ..................... | B61F 3/125 |
| | | | 105/4.3 |
| 10,227,076 B2 * | 3/2019 | Bavaresco ............... | B61F 5/22 |

(Continued)

FOREIGN PATENT DOCUMENTS

| | | | | |
|---|---|---|---|---|
| CN | 106740897 A | * | 5/2017 | ............... B61C 9/50 |
| CN | 105667533 B | * | 7/2018 | |

(Continued)

OTHER PUBLICATIONS

French Search Report issued for French Patent Application No. 21 07248, dated Mar. 15, 2022 in 2 pages.

*Primary Examiner* — Cheng Lin

(74) *Attorney, Agent, or Firm* — Knobbe, Martens, Olson & Bear, LLP

(57) ABSTRACT

A chain of semi-trailer vehicles is intended to be articulated to a main vehicle. Each semi-trailer vehicle includes a body and a single bogie supporting the body, known as a trailer bogie. The bodies of the semi-trailer vehicles are successively articulated to one another from a first semi-trailer vehicle of the chain by a separate inter-body joint. Each inter-body joint is carried by one end of each semi-trailer vehicle connected to a following vehicle. Each inter-body joint is articulated along a vertical pivot axis. Each trailer bogie of a body carries an inter-body joint arranged longitudinally with respect to the body so that the bogie axis and the interconnection axis are offset.

11 Claims, 6 Drawing Sheets

(56) References Cited

U.S. PATENT DOCUMENTS

| | | | | |
|---|---|---|---|---|
| 2005/0183627 | A1 * | 8/2005 | Hommen | B61F 5/14 |
| | | | | 105/453 |
| 2006/0260503 | A1 * | 11/2006 | Jeunehomme | B61F 3/125 |
| | | | | 105/4.1 |
| 2012/0118194 | A1 * | 5/2012 | Schneider | B61F 5/24 |
| | | | | 105/171 |

FOREIGN PATENT DOCUMENTS

| | | | | | | |
|---|---|---|---|---|---|---|
| CN | 110877624 | A | * | 3/2020 | | B61F 5/12 |
| DE | 3407574 | A1 | | 9/1985 | | |
| DE | 10144604 | A1 | * | 4/2002 | | B60F 1/046 |
| EP | 0347334 | A1 | * | 12/1989 | | |
| EP | 0537702 | A1 | | 4/1993 | | |
| EP | 1 630 057 | A1 | | 3/2006 | | |
| EP | 1 674 367 | A1 | | 6/2006 | | |
| EP | 1 721 803 | A1 | | 11/2006 | | |
| EP | 2724912 | A1 | | 4/2014 | | |
| EP | 3450280 | A1 | * | 3/2019 | | B61F 5/04 |
| FR | 2874566 | A1 | * | 3/2006 | | B61D 3/10 |
| GB | 1337482 | A | | 11/1973 | | |

* cited by examiner

CHAIN OF SEMI-TRAILER VEHICLES AND ASSOCIATED ARTICULATED TRAINSET

CROSS-REFERENCE TO RELATED APPLICATION

This application claims priority to French Patent Application No. 2107248 filed on Jul. 5, 2021, the disclosure of which including the specification, the drawings, and the claims is hereby incorporated by reference in its entirety.

FIELD OF THE INVENTION

The present invention relates to a chain of semi-trailer vehicles. The present invention also relates to an associated articulated train.

BACKGROUND OF THE INVENTION

In the railway field, different configurations of articulated trains have been developed.

One known configuration is the articulated Jacobs bogie train. In this configuration, the Jacobs bogies are placed between two bodies so that the corresponding cars distribute their weight over half of each bogie. The pivot axis of each Jacobs bogie coincides with the inter-body joint axis.

However, in order to accommodate four secondary suspensions, Jacobs bogies have a larger wheelbase (distance between the axles of this bogie) compared to conventional bogies, which reduces their ability to negotiate tight curves. In addition, Jacobs bogies are generally more difficult to motorise due to fit and space constraints in the gangway areas under which Jacobs bogies are placed. Finally, Jacobs bogies have the disadvantage of being more expensive than conventional bogies because of the doubled equipment, including four suspensions, two anti-roll devices (one for each body), possibly four vertical dampers and lifting systems to accommodate both bodies.

Another known configuration uses only conventional bogies with two secondary suspensions. In this configuration, a conventional bogie is arranged under the gangway area so that only one end of the body, the so-called carrying end, rests on the bogie. The adjacent body, i.e. the carried end, rests on the first body via an inter-body joint with a vertical axis. The bogie axis (pivot axis) and the inter-body joint axis are the same. To achieve this, the carrying end has its suspension supports cantilevered from the main structure.

However, such a configuration greatly complicates the end of the body, which leads to significant costs.

There is therefore a need for an articulated vehicle configuration capable of negotiating tight curves that is easier to implement.

SUMMARY OF THE INVENTION

To this end, one object of the present description is a chain of semi-trailer vehicles, intended to be articulated to a main vehicle, each semi-trailer vehicle comprising a body and a single body-supporting bogie, known as a trailer bogie, each trailer bogie being articulated with respect to the corresponding body along a vertical pivot axis, known as the bogie axis, one of the end vehicles of the chain, known as the first semi-trailer vehicle, being intended to be articulated to the main vehicle, the bodies of the semi-trailer vehicles being successively articulated to one another from the first semi-trailer vehicle of the chain by a separate inter-body joint, each inter-body joint being carried by one end of each semi-trailer vehicle connected to a following vehicle, each inter-body joint being articulated along a vertical pivot axis, each trailer bogie of a body carrying an inter-body joint being arranged longitudinally with respect to the body so that the bogie axis and the interconnection axis are offset.

According to particular embodiments, the device comprises one or more of the following features taken in isolation or in any combination that is technically possible:
- the bogie axis and the corresponding interconnection axis are offset by a distance D, the distance D being less than or equal to half the distance between the axles of the corresponding bogie, preferably less than or equal to 1500 mm, advantageously less than or equal to 450 mm;
- each inter-body joint is also articulated along a horizontal pivot axis, the inter-body joint being torsionally articulated along the horizontal pivot axis and conically articulated along the vertical pivot axis;
- each inter-body joint is a cross-axis ball joint, such as a rubber and metal ball joint.

The present description also relates to an articulated railway train comprising:
- a. a main vehicle comprising a body, two body-supporting bogies, known as main bogies, and an inter-body joint carried by the body, and
- b. at least one chain of semi-trailer vehicles as described above, the first vehicle of the chain being articulated to the body of the main vehicle by the inter-body joint of the main vehicle.

According to particular embodiments, the train comprises one or more of the following features taken in isolation or in any combination that is technically possible:
- each main bogie is articulated with respect to the body of the main vehicle along a vertical pivot axis, known as the bogie axis, the inter-body joint of the main vehicle being articulated along a vertical pivot axis, one of the main bogies being arranged longitudinally with respect to the body of the main vehicle so that the bogie axis and the corresponding vertical pivot axis are offset, the offset being advantageously identical to the corresponding offset of the semitrailers;
- the main vehicle is an end vehicle of the train, advantageously the lead vehicle;
- one of the main bogies, the so-called first bogie, comprises two secondary suspensions and a single central back-up suspension, the other main bogie, the so-called second bogie, comprises two secondary suspensions and a back-up suspension specific to each secondary suspension, the first bogie and the second bogie defining only three support points for the body of the main vehicle when the secondary suspensions of the first bogie are dysfunctional;
- the first bogie has no anti-roll system;
- the secondary suspensions of the first bogie are pneumatically connected to each other, the first bogie and the second bogie defining only three support points for the main vehicle body when the secondary suspensions of the first bogie are functional.

BRIEF DESCRIPTION OF THE DRAWINGS

Other characteristics and advantages of the invention will become apparent upon reading the following description of embodiments of the invention, given only as an example and referencing the drawings, in which.

DETAILED DESCRIPTION OF THE PREFERRED EMBODIMENTS

In the description, the term "longitudinal" is defined in relation to the direction in which the vehicle runs, i.e. the direction in which the rails on which that vehicle runs extend. The longitudinal direction is represented in the figures by an X-axis. The term "transverse" is defined in relation to a direction substantially perpendicular to the longitudinal direction in a horizontal plane, i.e. the direction in which the rails are separated from each other. The transverse direction is represented in the figures by a Y-axis. The direction perpendicular to the longitudinal and transverse direction is called the "vertical direction" and is represented in the figures by a Z-axis. The terms "front" and "rear" are defined in relation to the running direction of the rail vehicle.

Figure 1:
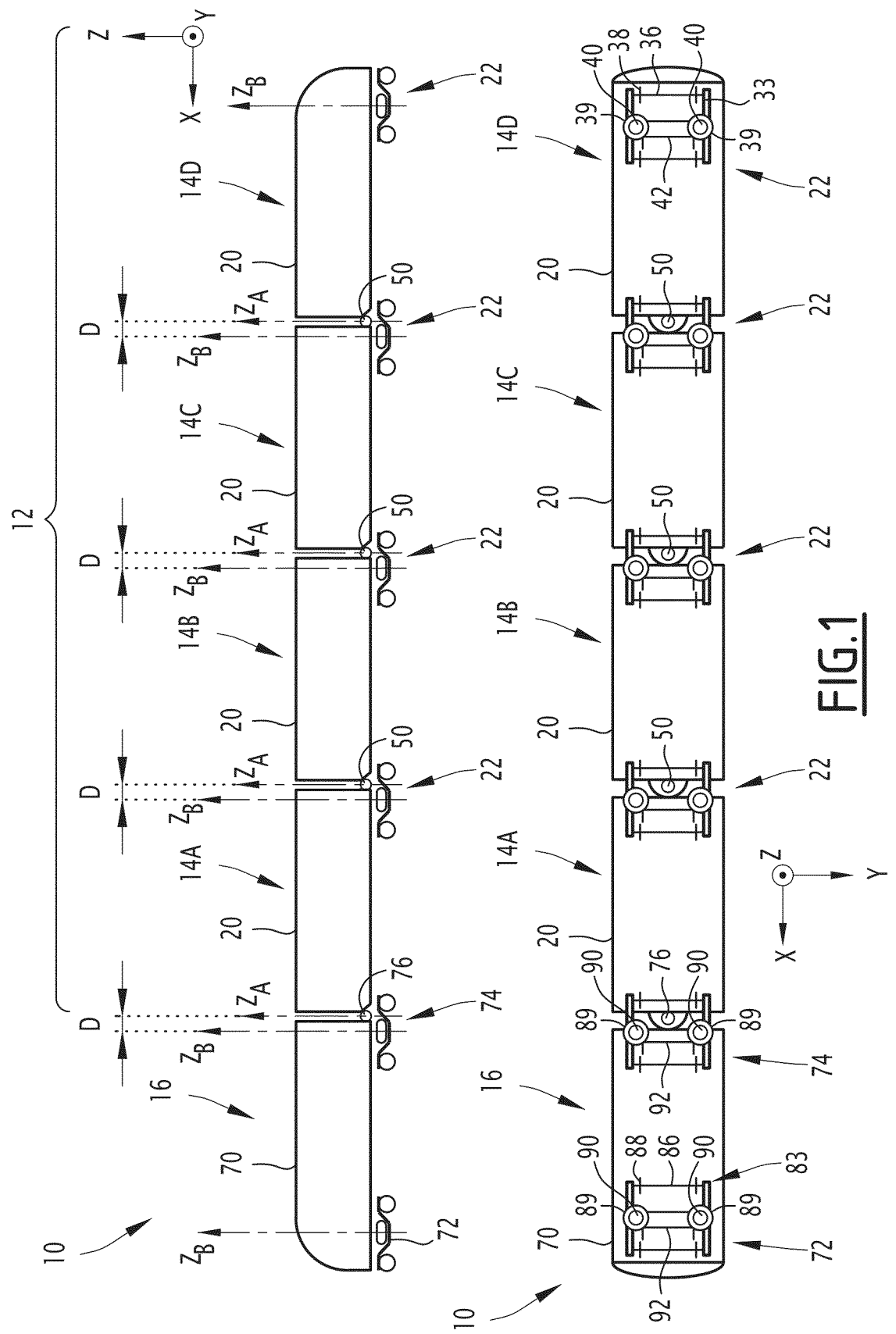
FIG. 1, a schematic representation of an example of an articulated railway train comprising a main vehicle interconnected to a chain of semi-trailer vehicles, the train being visible from the side in the top representation and from below in the bottom representation, FIG. 2, a schematic representation of an example of two bodies articulated together by an inter-body joint.
Figure 2:
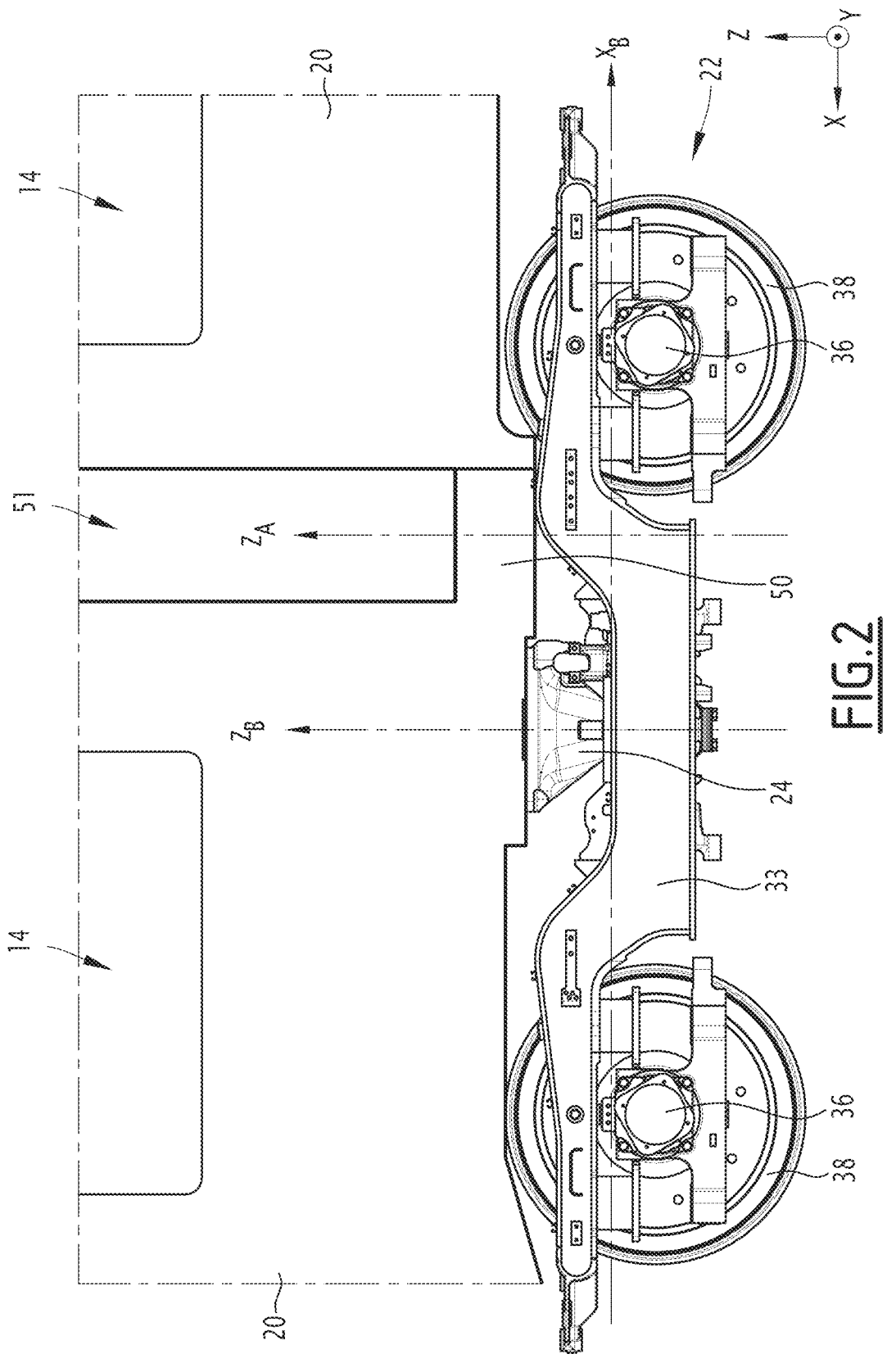
Figure 3:
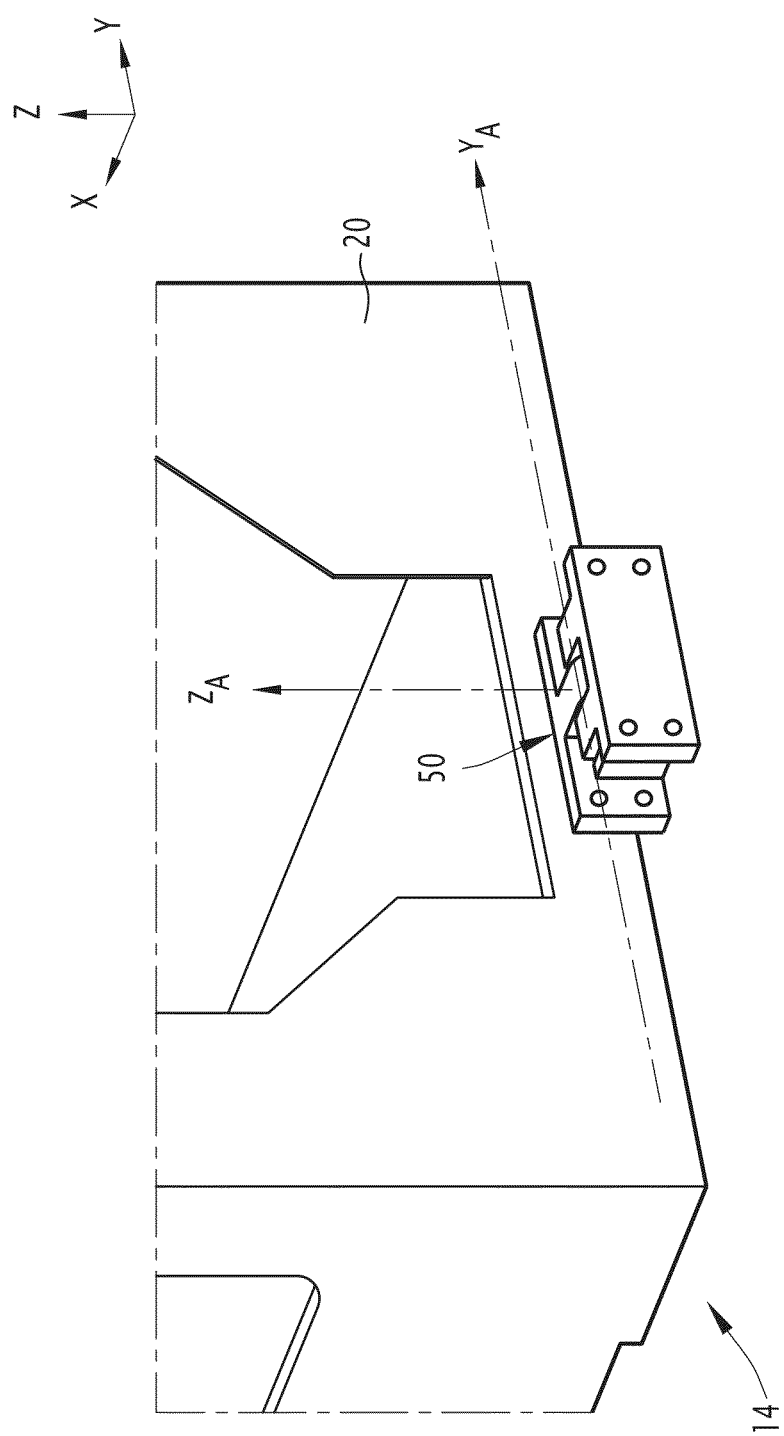
FIG. 3, is a schematic representation of an example of an inter-body joint, FIG. 4, a schematic representation of another example of an articulated railway train comprising a main vehicle interconnected to a chain of semi-trailer vehicles, with only the main vehicle differing from the example in FIG. 1, FIG. 5, a schematic representation of an example of a first bogie of a main vehicle, the first bogie defining a single fulcrum at least when the lateral air suspensions of said bogie are malfunctioning, and FIG. 6, a schematic representation of the first bogie of FIG. 5 seen in cross-section along a longitudinal axis, called the central longitudinal axis.

A first embodiment of an articulated railway train 10 is illustrated in FIG. 1 with details given as examples in FIGS. 2 and 3. The articulated railway train 10 is, for example, a train, a metro, a tramway, or more generally any other type of rolling structure.

In this example, the articulated train 10 comprises a chain 12 of semi-trailer vehicles 14, articulated to a main vehicle 16.

Alternatively, the articulated train 10 comprises one or more further chains 12 of semi-trailer vehicles 14, articulated to the main vehicle 16 (other end) or to another main vehicle 16 for example.

Each chain 12 of semi-trailer vehicles 14 comprises at least one semi-trailer vehicle 14. In the example shown in FIG. 1, the chain 12 comprises four semi-trailer vehicles 14A, 14B, 14C and 14D.

An end vehicle of the chain 12, the so-called first semi-trailer vehicle, is articulated to the main vehicle 16. The other semi-trailers 14 in the chain 12 are then linked to each other from the first vehicle. In the example shown in FIG. 1, the first vehicle is a the vehicle 14A.

Each semi-trailer vehicle 14 comprises a body 20 and a single body support bogie 20, the so-called trailer bogie 22.

Each trailer bogie 22 may or may not be motorised.

Each trailer bogie 22 has a central pivot 24 defining a vertical pivot axis, the so-called bogie axis $Z_B$. Each trailer bogie 22 is articulated to the corresponding body 20 along the bogie axis $Z_B$. The central pivot 24 also defines a central longitudinal axis $X_B$, the central longitudinal axis $X_B$ being in the longitudinal direction X and passing through the central pivot 24.

Each trailer bogie 22 comprises, for example, a chassis 33, two axles 36 each with two wheels 38 (only one reference 36 and 38 are shown in FIG. 1 so as not to clutter the figure) and two secondary suspensions 39. Each secondary suspension 39 is preferably associated with a back-up suspension 40. Each trailer bogie 22 further comprises an anti-roll system 42. The secondary suspension 39, the back-up suspension 40 and the anti-roll system 42 are only shown on the car 14D in FIG. 1 to avoid cluttering the figure.

A secondary suspension is an air suspension between the chassis of a bogie and the vehicle body supported by the bogie. A back-up suspension is an air suspension that can replace a secondary suspension when the secondary suspension fails (e.g. is deflated or punctured).

The secondary suspensions 39 are the only secondary suspensions of a trailer bogie 22. The secondary suspensions 39 are lateral suspensions, i.e. located on either side of the central longitudinal axis $X_B$.

The secondary suspensions 39 comprise, for example, at least one air spring.

The back-up suspensions 40 comprise, for example, a back-up foot, such as a rubber and metal foot.

The anti-roll system 42 is, for example, formed by one or more anti-roll bars. In the example shown in FIG. 1, the anti-roll system 42 of the trailer bogies 22 comprises an anti-roll bar.

Each trailer bogie 22 connected to a subsequent vehicle of the train 10 further comprises an inter-body joint 50. The inter-body joint 50 is carried at the end of the body 20 of the corresponding vehicle. An example of such an inter-body joint 50 is shown in FIGS. 1 to 3.

In the example shown in FIG. 1, only the semi-trailer vehicle 14D, which is not connected to a following vehicle, does not comprise an inter-body joint 50. However, in one variant, all semi-trailer vehicles 14, even those not connected to a following vehicle, comprise an inter-body joint 50.

Preferably, as illustrated in FIG. 3, the inter-body joint 50 is opposite the gangway area 51 between the two articulated vehicles.

Each inter-body joint 50 is articulated along a horizontal pivot axis $Y_A$ and a vertical pivot axis $Z_A$. The articulation along the horizontal pivot axis $Y_A$ allows passage through hollows and bumps. The articulation along the vertical pivot axis $Z_A$ allows for passage through curves.

Either the horizontal pivot axis $Y_A$ or the vertical pivot axis $Z_A$ is a main axis of revolution for the inter-body joint 50 such that:

applying a torque about the main axis of revolution causes an angular elastic deformation in torsion (in the reference frame of the joint) represented by a torsion angle, and applying a perpendicular axis torque to the main axis of revolution causes an angular elastic deformation in conical (in the reference frame of the joint) represented by a conical angle.

Preferably, the main axis of revolution of the inter-body joint 50 is the horizontal pivot axis $Y_A$. Thus, the inter-body joint 50 is torsionally articulated along the horizontal pivot axis $Y_A$ and conically articulated along the vertical pivot axis $Z_A$. In this case, the inter-body joint 50 is, for example, a cross-axis ball joint. The ball joint is, for example, made of rubber and metal. The fact that the main axis of rotation is in the transverse direction Y makes it possible to simplify the body ends compared to a joint whose main axis of rotation is in the direction of elevation Z and for which one of the ends of the supporting body is cantilevered with respect to the main structure.

FIG. 3 shows an example of an inter-body joint 50 that is torsionally articulated along a transverse axis $Y_A$ (main axis of revolution).

Each trailer bogie 22 of a body 20 carrying an inter-body joint 50 is arranged longitudinally with respect to the body 20 so that the bogie axis $Z_B$ and the vertical pivot axis $Z_A$ are offset by a distance D.

Preferably, the distance D is less than or equal to half the wheelbase of the trailer bogie 22. The wheelbase is the distance between the axles of a bogie. Half the wheelbase is therefore the distance between the bogie pivot axis and an axle. Thus, the inter-body joint 50 is arranged between the bogie pivot axis and the axle. The axle is, for example, located between 1 metre and 1.5 metres from the bogie axis (i.e. the articulation is between 0 and 1 to 1.5 metres from the bogie axis).

Advantageously, the distance D is less than or equal to 450 mm in order to limit the overhang.

Preferably, each trailer bogie 22 of a body 20 carrying an inter-body joint 50 is at least partly opposite said inter-body joint 50.

Thus, each semi-trailer vehicle 14 comprises only three support points, namely:
   a first support point formed by the articulation of the preceding vehicle to which the semi-trailer vehicle 14 is articulated, and
   a second and a third support point, each formed by the secondary suspensions 39 of the trailer bogie 22 carrying the vehicle body 20 or the back-up suspensions 40 when the secondary suspensions 39 are defective.

The main vehicle 16 comprises a body 70, two body 70 support bogies, so-called main bogies 72, 74, and at least one inter-body joint, called the inter-body joint 76, carried by the body 70.

Each main bogie 72, 74 may or may not be motorised.

Each main bogie 72, 74 has a central pivot 80 defining a vertical pivot axis, the so-called bogie axis $Z_B$. Each main bogie 72, 74 is articulated to the corresponding body 70 along the bogie axis $Z_B$. The central pivot 80 also defines a central longitudinal axis $X_B$, the central longitudinal axis $X_B$ being in the longitudinal direction X and passing through the central pivot 80.

In one example configuration, as shown in FIG. 1, each main bogie 72, 74 comprises, for example, a chassis 83, two axles 86 each with two wheels 88 (only one reference 83, 86 and 88 are shown in FIG. 1 so as not to clutter the figure) and two secondary suspensions 89. Each secondary suspension 89 is preferably associated with a back-up suspension 90. Each main bogie 72, 74 further comprises an anti-roll system 92.

In the example shown in FIG. 1, the main bogies 72, 74 are identical, and the main vehicle 16 is supported on four support points.

The secondary suspension 89, the back-up suspension 90 and the anti-roll system 92 are for example identical to the corresponding elements of the trailer bogies 22. More generally, the main bogies 72, 74 are for example identical to the trailer bogies 22.

The inter-body joint 76 allows the first vehicle 14 of the semi-trailer vehicle 14 chain 12 to be articulated to the main vehicle 16.

The inter-body joint 76 of the main vehicle 76 is preferably identical to the inter-body joints 50 of the semi-trailer vehicles 14.

One of the main bogies, i.e. the main bogie 74 (closest longitudinally to the inter-body joint 76), is arranged longitudinally with respect to the body 70 so that the bogie axis $Z_B$ and the corresponding vertical pivot axis $Z_A$ are offset. The misalignment is advantageously identical to the corresponding offset of the axes of the trailer bogies 22 and inter-body joints 50 (same conditions on the distance D in particular).

In the operation of the train 10 shown in FIGS. 1 to 3, the main vehicle 16 is supported by two bogies 72, 74 and each semi-trailer vehicle 14 is supported by a single trailer bogie 22.

Each semi-trailer vehicle 14 is supported on three support points, which makes it easier to negotiate tracks with defects, such as track twists. A track twist is a flat distortion that allows a change from a flat to a canted track section (difference in height between two rails of the same track facing each other). The main vehicle 16, on the other hand, is four-point supported.

Thus, such an articulated train configuration 10 is simple to implement, as the trailer bogies 22 and main bogies 72, 74 are, for example, conventional bogies. In addition, the drive unit can be fitted to any bogie.

In addition, the offset of the bogie axis $Z_B$ and the vertical pivot axis $Z_A$ greatly facilitates the manufacture of the body ends compared to the architecture of the state of the art comprising carried and carrying ends. In particular, this allows the use of inter-body joints with a main axis of revolution in the transverse direction Y.

The main vehicle 16 can be positioned anywhere in the train. However, a position at the head of the train facilitates the manufacture of the train.

The present configuration is therefore simple to implement and allows for vehicles that are able to negotiate tight curves and are motorised.

Figure 4:
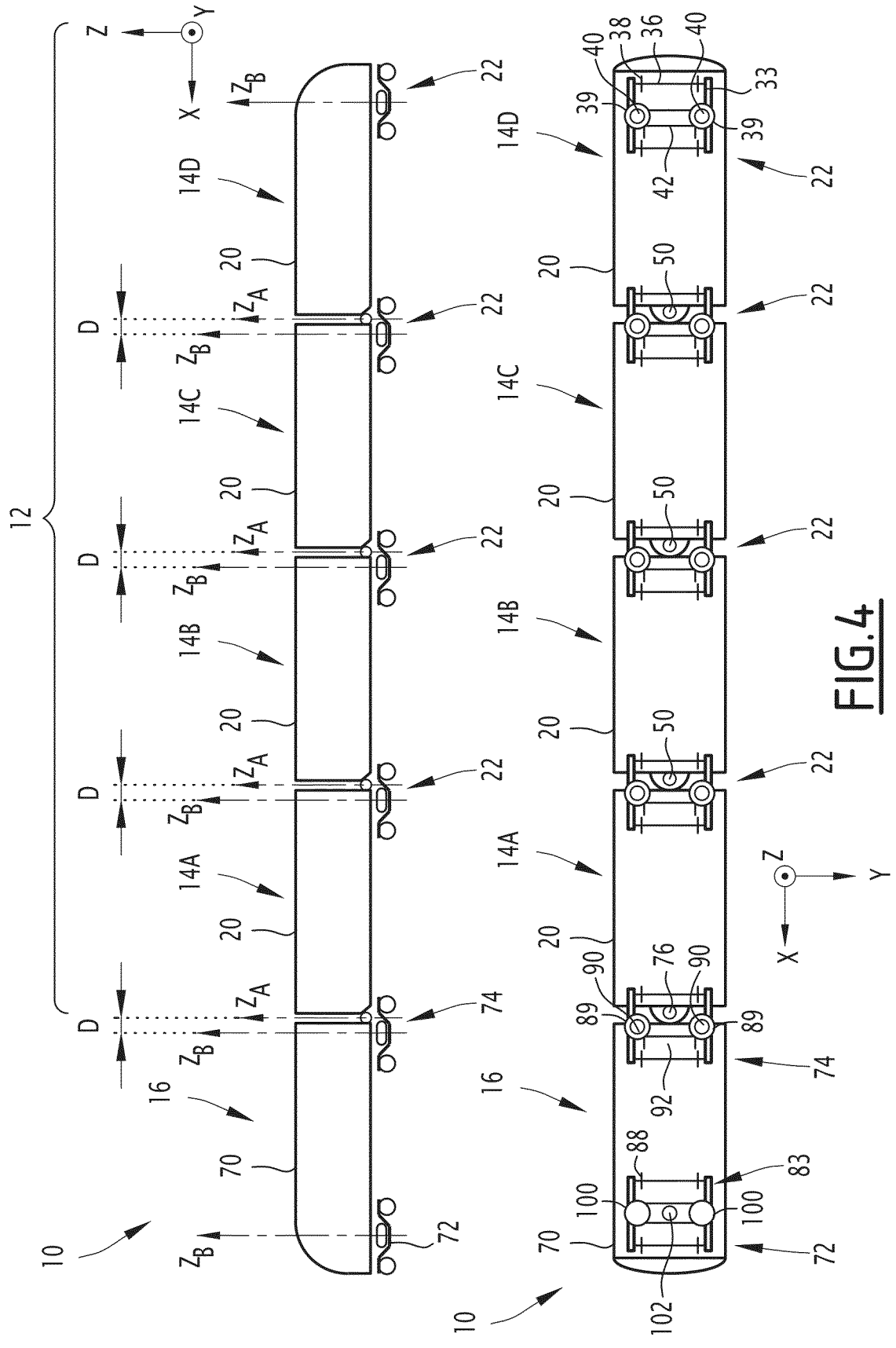
Figure 5:
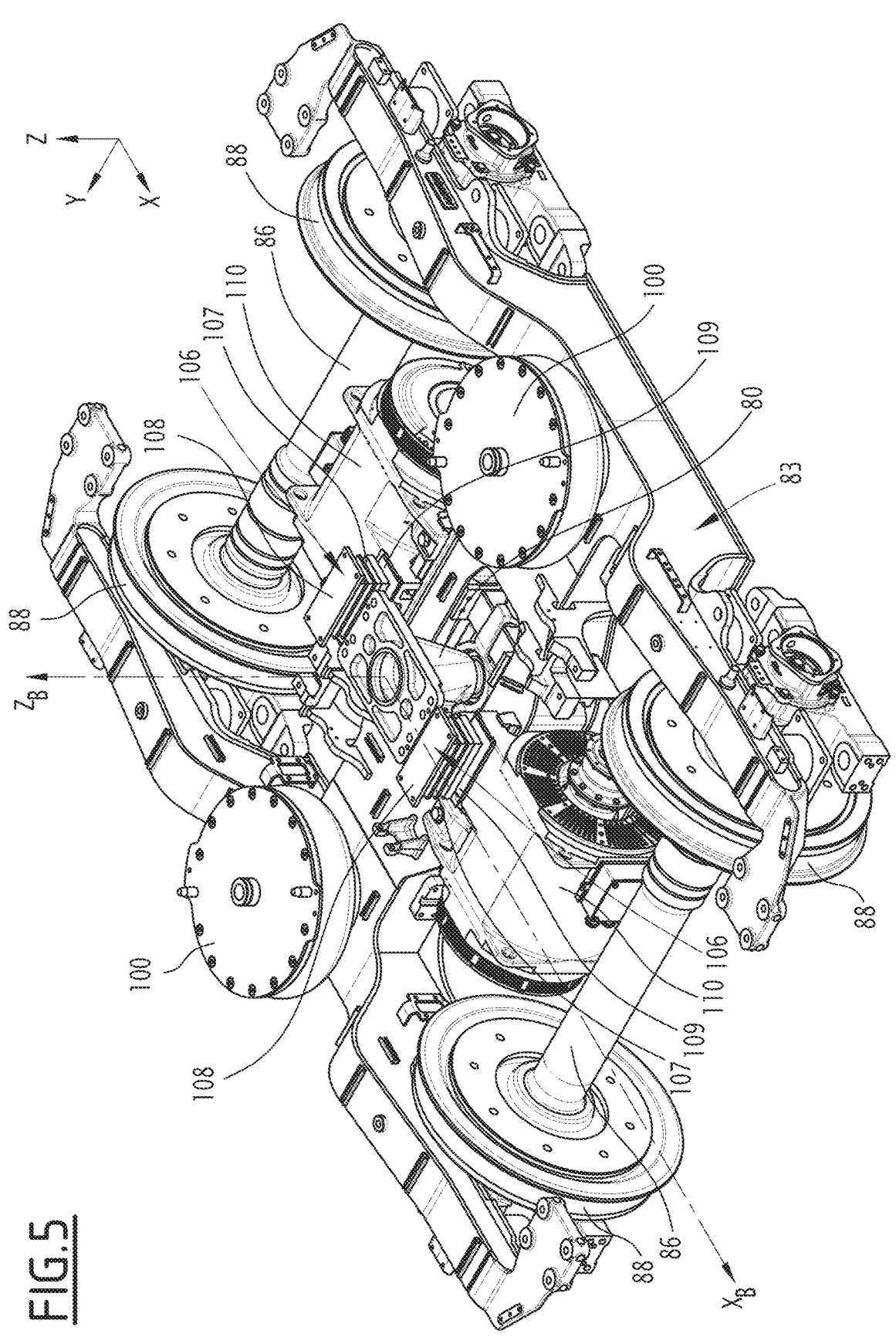
Figure 6:
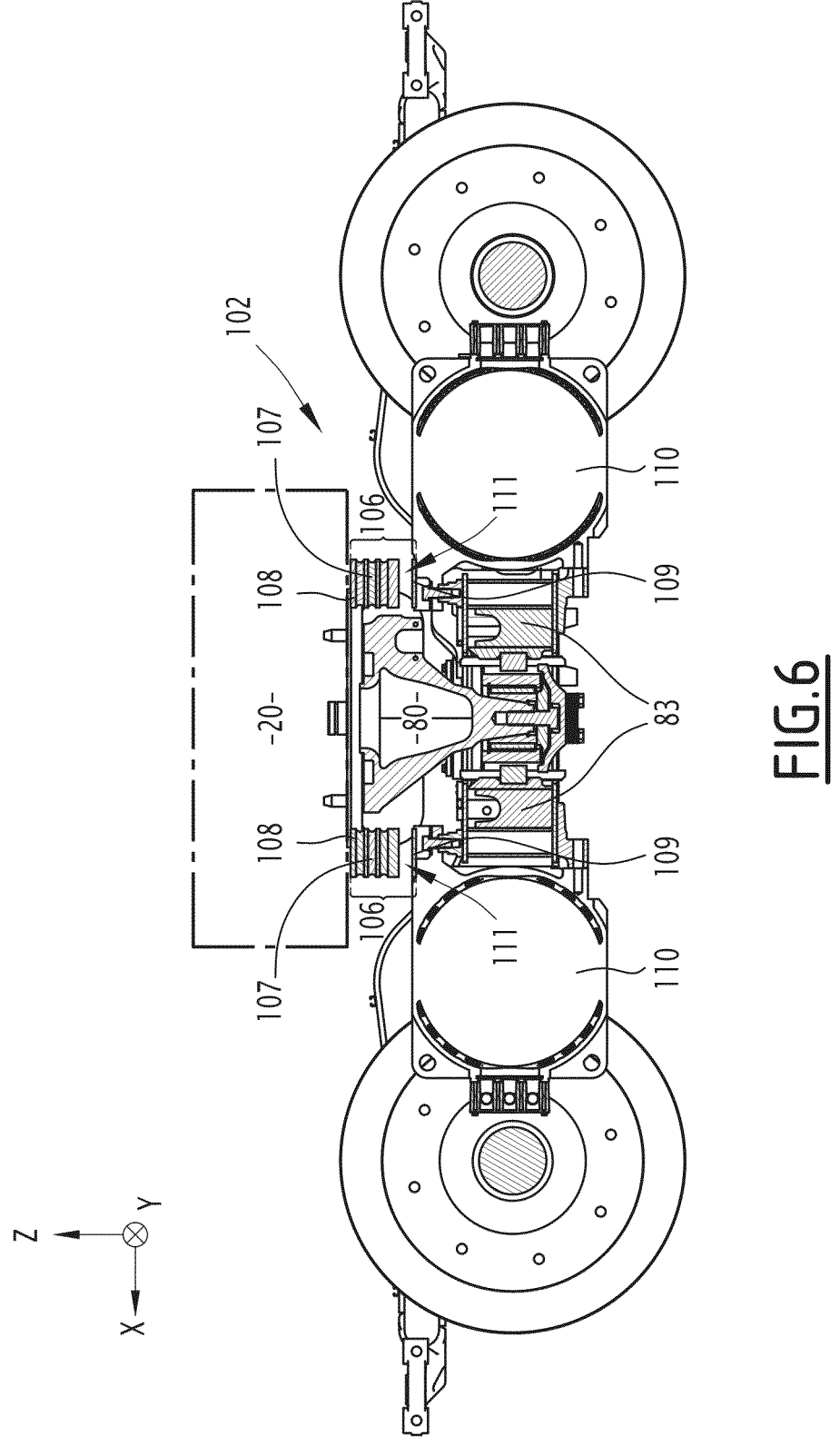

A second embodiment of an articulated railway train 10 is illustrated in FIG. 4 with details given as examples in FIGS. 5 and 6.

The articulated train 10 of the second embodiment is identical to that of the first embodiment, with the difference that the first bogie 72 of the main vehicle 16 has a different structure than the first bogie 72 of the first embodiment. Only the specific features of the first bogie 72 of the second embodiment are described in the following.

The first bogie 72 comprises two first secondary suspensions 100 and a single central back-up suspension 102 (the only back-up suspension of the first bogie 72).

The first secondary suspensions 100 are air suspensions.

Preferably, the secondary suspensions 100 are arranged laterally on either side of the central back-up suspension 102. Preferably, the central back-up suspension 102 is arranged on the chassis 83 on the central longitudinal axis $X_B$, which allows a better distribution of the vehicle weight on the first bogie 72.

In one embodiment, as illustrated in FIGS. 5 and 6, the central back-up suspension 102 comprises two back-up elements 106 arranged on the central longitudinal axis $X_B$ on either side of the central pivot 80.

In the example shown in FIGS. 5 and 6, each back-up element 106 comprises an elastic member 107, an attachment plate 108 and a support element 109.

The elastic member 107 has a spring function. The elastic member 107 is adapted to be attached, via the attachment plate 108, either to the body 20 (as shown in FIG. 4) or to the bogie.

The support element 109 is attached on the opposite side to the elastic member 107, i.e. is attached to the first bogie 72 when the elastic member 107 is attached to the body 20 (as illustrated in FIG. 4) or is attached to the body 20 when the elastic member 107 is attached to the first bogie 72. When the support element 109 is attached to the bogie, it is for example attached directly to the chassis 83 or to any element itself attached to the chassis 83. For example, when the first bogie 72 is a motor bogie, as shown in FIGS. 5 and 6, the support element 109 is attached to the motor 110, which in turn is attached to the chassis 83.

The support element 109 is preferably made of a material chosen to reduce the coefficient of friction and to have good anti-wear properties. The material of the support member 109 is, for example, a Teflon® coated metal or a nylon type polymer, such as Ertalon®.

An operating clearance 111 is present between the elastic member 107 and the support element 109, which allows the corresponding secondary air suspension 100 to be the only one in operation when this secondary air suspension 100 is inflated (normal mode). In the event of damage (degraded mode), the secondary air suspension 100 is no longer active and the operating clearance 111 between the elastic member 107 and the support element 109 is filled so that the back-up element 106 replaces said secondary air suspension 100.

Although the example in FIGS. 5 and 6 describes a central back-up suspension 102 with two back-up elements 106, in one embodiment only one back-up element 106 is present. Such a back-up element 106 is, for example, arranged upstream or downstream of the central pivot 80 on the central longitudinal axis $X_B$. However, an arrangement with two back-up elements 106 has the advantage of being more stable than an arrangement with only one back-up element 106, and of distributing the forces over a doubled support surface.

In another embodiment, the central back-up suspension 102 comprises a number of back-up elements 106 strictly greater than two. In this case, the back-up elements 106 are arranged around the central pivot 80 so that they form a single point of support.

In another embodiment, the central back-up suspension 102 comprises an annular suspension. The annulus is attached to the centre pin 80, i.e. the centre pin 80 passes through the hole in the annulus. Preferably, the annulus is made at least partly of elastomeric material. However, the previous configuration with members 106 is easier to access in the case of maintenance operations, as the members 106 are arranged on either side of the central pivot 80, and are not inserted on the central pivot 80.

Advantageously, the first bogie 72 has no anti-roll system.

Thus, in this configuration, the first bogie 72 only defines a support point (the central back-up suspension 102) when at least the secondary suspensions 100 are dysfunctional. Thus, the first bogie 72 and the second bogie 74 define three support points for the body 70 of the main vehicle 16 when at least the secondary suspensions 100 are dysfunctional.

Advantageously, the secondary suspensions 100 of the first bogie 72 are pneumatically connected to each other, for example, by a pneumatic hose or tube. The secondary suspensions 100 therefore have approximately the same air pressure under normal operating conditions. In such a case, the first bogie 72 and the second bogie 74 also define only three support points for the body 70 of the main vehicle 16 when the secondary suspensions 100 are functional.

The secondary suspensions 100 are for example supplied via a control component. The control component is suitable for regulating the air pressure in the secondary suspensions 100, in particular as a function of the load on the body 70 supported by the first bogie 72. Such a control component allows inflation (injection of air from an air compressor) or deflation (venting to the outside—ambient air).

Preferably, the control component is arranged on or in the chassis 83 on the central longitudinal axis $X_B$.

The control component is, for example, a levelling valve. The levelling valve is, for example, mechanically operated.

In another example, the control component is a solenoid valve. The solenoid valve is, for example, controlled by a position sensor measuring the distance between the first bogie 72 and the body 70. Thus, in addition to the advantages conferred by the first embodiment, the second embodiment allows the body 70 of the main vehicle 16 to be supported by three support points at least in back-up operation, and advantageously also in normal operation. Such a three-point support configuration is called isostatic. A three-point support is particularly suitable for driving on lanes with geometric defects, especially long or short lane lefts, thus improving vehicle safety. In particular, with such a configuration, the effects of body twisting and wheel unloading are reduced.

In addition, when the first bogie 72 has no anti-roll system, the body 70 is held in roll only by the second bogie 74, which limits the twisting of the body 70 and facilitates passage on tracks with geometric defects.

The skilled person will appreciate that the above-described embodiments and variants can be combined to form new embodiments, provided that they are technically compatible.

What is claimed is:

1. An articulated railway train comprising a. a main vehicle comprising a body, two bogies supporting the body, known as main bogies, and an inter-body joint carried by the body, and b. at least one chain of semi-trailer vehicles, intended to be articulated to a main vehicle, each semi-trailer vehicle comprising a body and a single bogie supporting the body, known as a trailer bogie, each trailer bogie being articulated with respect to the corresponding body along a vertical pivot axis, known as the bogie axis, one of the end vehicles of the chain, known as the first semi-trailer vehicle, being intended to be articulated to the main vehicle, the bodies of the semi-trailer vehicles being successively articulated to one another from the first semi-trailer vehicle of the chain by a separate inter-body joint, each inter-body joint being carried by one end of each semi-trailer vehicle connected to a following vehicle, each inter-body joint being articulated along a vertical pivot axis, each trailer bogie of a body carrying an inter-body joint being arranged longitudinally with respect to the body so that the bogie axis and the interconnection axis are offset, the first vehicle of the chain being articulated to the body of the main vehicle by the inter-body joint of the main vehicle, wherein one of the main bogies, the so-called first bogie, comprises two secondary suspensions and a single central back-up suspension, the other main bogie, the so-called second bogie, comprises two secondary suspensions and a back-up suspension specific to each secondary suspension, the first bogie and the second bogie defining only three support points for the body of the main vehicle when the secondary suspensions of the first bogie are malfunctioning, wherein each inter-body joint is a cross-axis ball joint which is a rubber and metal ball joint.

2. The articulated railway train according to claim 1, wherein the bogie axis and the corresponding interconnecting axis are offset by a distance D, the distance D being less than or equal to half the distance between the axles of the corresponding bogie.

3. The articulated railway train according to claim 2, wherein the distance D is less than or equal to 1500 mm.

4. The articulated railway train according to claim 3, wherein the distance D is less than or equal to 450 mm.

5. The articulated railway train according to claim 1, wherein each inter-body joint is also articulated along a horizontal pivot axis, the inter-body joint being torsionally articulated along the horizontal pivot axis (YA) and conically articulated along the vertical pivot axis.

6. The articulated train according to claim 1, in which each main bogie is articulated with respect to the body of the main vehicle according to a vertical pivot axis, known as the bogie axis, the inter-body joint of the main vehicle being articulated according to a vertical pivot axis, one of the main bogies being arranged longitudinally with respect to the body of the main vehicle so that the corresponding bogie axis and the vertical pivot axis are offset.

7. The articulated train according to claim 6, wherein the offset is identical to the corresponding offset of the semi-trailers.

8. The articulated train according to claim 1, wherein the main vehicle is an end vehicle of the train.

9. The articulated train according to claim 8, wherein the main vehicle is the lead vehicle.

10. The articulated train according to claim 1, wherein the first bogie is devoid of an anti-roll system.

11. The articulated train according to claim 1, wherein the secondary suspensions of the first bogie are pneumatically connected to each other, the first bogie and the second bogie defining only three support points for the body of the main vehicle when the secondary suspensions of the first bogie are functional.

* * * * *